(12) United States Patent
Chou et al.

(10) Patent No.: US 11,851,363 B2
(45) Date of Patent: Dec. 26, 2023

(54) METHOD FOR MANUFACTURING ULTRA-THIN GLASS SUBSTRATE AND METHOD FOR MANUFACTURING DISPLAY PANEL

(71) Applicant: Flexi Glass Co., Ltd., Bozhou (CN)

(72) Inventors: Hao-Yu Chou, Jiaxing (CN); Cheng-Chung Chiang, Jiaxing (CN); Tian-Ming Wu, Jiaxing (CN); Chun-Chieh Huang, Jiaxing (CN); Feng Chen, Jiaxing (CN)

(73) Assignee: Flexi Glass Co., Ltd., Bozhou (CN)

( * ) Notice: Subject to any disclaimer, the term of this patent is extended or adjusted under 35 U.S.C. 154(b) by 140 days.

(21) Appl. No.: 17/218,306

(22) Filed: Mar. 31, 2021

(65) Prior Publication Data
US 2022/0127186 A1   Apr. 28, 2022

(30) Foreign Application Priority Data

Oct. 26, 2020 (CN) .......................... 202011157028.8
Oct. 26, 2020 (CN) .......................... 202011158607.4
Oct. 26, 2020 (CN) .......................... 202011158629.0

(51) Int. Cl.
C03C 15/00 (2006.01)
C03C 17/32 (2006.01)

(52) U.S. Cl.
CPC .............. *C03C 15/00* (2013.01); *C03C 17/32* (2013.01); *C03C 17/324* (2013.01); *C03C 17/326* (2013.01); *C03C 17/328* (2013.01)

(58) Field of Classification Search
CPC ..... C03C 15/00; C03C 2218/34; C03C 17/32; C03C 17/324; C03C 17/326
See application file for complete search history.

(56) References Cited

U.S. PATENT DOCUMENTS 10,233,112 B2   3/2019   Hackert et al.
11,050,042 B2   6/2021   Zhang et al.
(Continued)

FOREIGN PATENT DOCUMENTS

CN    102557467 A    7/2012
CN    102992599 A    3/2013
(Continued)

OTHER PUBLICATIONS

Chinese Office Action for Chinese Application No. 202011157028.8 dated Mar. 25, 2022 (16 pages).
(Continued)

*Primary Examiner* — Binh X Tran
(74) *Attorney, Agent, or Firm* — REISING ETHINGTON, P.C.

(57) ABSTRACT

A method for manufacturing an ultra-thin glass substrate includes: providing a glass base material preset with n substrate areas and a skeleton area surrounding the substrate areas; at least forming an etching protection layer on an upper surface and a lower surface of each substrate area of the glass base material, respectively; at least etching the skeleton area of the glass base material to separate the substrate areas from the glass base material, and form a stress dissipation edge along an edge of each substrate area; and removing the etching protection layer to get independent glass substrates. A method for manufacturing a display panel is also disclosed. An aim is to prevent quality of the ultra-thin glass substrate from damage caused by scribing wheel cutting or laser cutting, therefore the quality of the ultra-thin glass substrate is improved.

18 Claims, 35 Drawing Sheets

(56) References Cited

U.S. PATENT DOCUMENTS

| | | | |
|---|---|---|---|
| 2011/0019354 A1* | 1/2011 | Prest | C03C 21/002 361/679.21 |
| 2015/0060401 A1* | 3/2015 | Chang | C03C 19/00 216/38 |
| 2021/0078899 A1 | 3/2021 | Da et al. | |

FOREIGN PATENT DOCUMENTS

| | | | |
|---|---|---|---|
| CN | 103304154 A | | 9/2013 |
| CN | 103508663 A | * | 1/2014 |
| CN | 103508663 A | | 1/2014 |
| CN | 103723927 A | | 4/2014 |
| CN | 104743889 A | | 7/2015 |
| CN | 108666352 A | | 10/2018 |
| CN | 111601780 A | | 8/2020 |
| JP | 2009093744 A | | 4/2009 |
| JP | 2011164508 A | | 8/2011 |
| JP | 2018081242 A | | 5/2018 |
| KR | 20160101103 A | | 8/2016 |
| TW | 201348165 A | | 12/2013 |

OTHER PUBLICATIONS

Chinese Office Action for Chinese Application No. 202011158629.0 dated Apr. 2, 2022 (18 pages).

Chinese Office Action for Chinese Application No. 202011158607.4 dated Apr. 6, 2022 (15 pages).

Chinese Office Action for Chinese Application No. 202011158629.0 dated Sep. 16, 2022 (6 pages).

English Translation of Chinese Office Action for Chinese Application No. 202011158629.0 dated Sep. 16, 2022 (6 pages).

Korean Office Action for Korean Application No. 9-5-2023-063375937 dated Jul. 12, 2023 (17 pages).

English Translation of Korean Office Action for Korean Application No. 9-5-2023-063375937 dated Jul. 12, 2023 (20 pages).

* cited by examiner

METHOD FOR MANUFACTURING ULTRA-THIN GLASS SUBSTRATE AND METHOD FOR MANUFACTURING DISPLAY PANEL

CROSS-REFERENCE TO RELATED APPLICATIONS

This application is based upon and claims priority to Chinese Patent Applications No. 202011157028.8, 202011158629.0, and 202011158607.4, all filed on Oct. 26, 2020, the entire contents of which are incorporated herein by reference.

TECHNICAL FIELD

The present disclosure relates to the technology of manufacturing a display panel, and more particularly to a method for manufacturing an ultra-thin glass substrate and a method for manufacturing a display panel.

BACKGROUND

Ultra-thin glass substrates (UTG substrates) are important parts of flexible cover plates. The quality of the ultra-thin glass substrates is key to realize a smaller bending radius or even a bending radius close or equal to 2 millimeters (mm). Especially when the UTG substrate is cut to a certain size, the edge needs to be specially processed to work out the defects such as edge breakages, microcracks, etc. caused by cutting, to prevent the substrate from being cracked for the defects. In general, two aspects of problems are often needed to be solved: (1) using which kind of cutting method to get a relatively straight edge, (2) using a processing method such as polishing to work out the edge defects.

Nowadays, scribing wheel cutting is limited to linear cutting. It is still hard to use the scribing wheel for irregular cutting (such as edge fillet). Furthermore, the UTG substrate without chemical reinforcing processing and having a thickness of about 100 micrometers (μm) is very fragile, and will easily generate fragments or unexpected defects such as edge breakages, microcracks, etc. when under the pressure of the scribing wheel. These defects are fatal to the following edge polishing and could directly cause the substrate to be scrapped. Therefore, it is important to get a substrate with a straight edge using an appropriate cutting method.

Compared with the scribing wheel cutting, laser cutting without mechanical forces can realize a better edge cutting effect and may be a main cutting method for future ultra-thin glass substrates. The laser cutting means uses the energy released when laser beam irradiates on a surface of a workpiece to melt and evaporate a part of the workpiece, so as to cut the workpiece to several pieces. The laser cutter applies no pressure on the surface of the glass. Therefore, the glass will not be damaged, and the laser cutter can be applied for different kinds of irregular cutting.

On the other hand, during the processing and transporting of the UTG substrates, quality defects can easily occur, such as the scratch to the surface of the glass or the damage caused by extruding with each other. Nowadays, a protection ink layer is sprayed on the two surfaces of the glass to at least reduce or eliminate the occurrence of the above defects. The manufacturing process includes: cutting a large sheet of UTG base material, edge polishing, chemical reinforcing, and spraying a protection ink layer. Lastly, function layers can be coated on the UTG substrates processed by the chemical reinforcing, to form a flexible cover plate.

Therefore, a general manufacturing method of an ultra-thin glass substrate includes: spraying a protection layer on the UTG substrate, laser cutting the UTG substrate to get a desired size, and then the performance of following manufacturing processes. However, it is a tough task to spray the ink uniformly on the surface of the UTG substrate, for it is hard to eliminate bubbles, make sure the film layer has a uniform thickness and a uniform color, and make sure the spraying environment is clean, etc. Meanwhile, during the laser cutting process, the laser often has the problem of scattering for the cutting path may not be sprayed uniformly, then the glass is not thoroughly cut, and the defects such as the glass being hard to be separated into pieces or seriously edge breakages, etc. may occur, which will seriously affect the following edge polishing process.

SUMMARY

In an embodiment of the present disclosure, a method for manufacturing an ultra-thin glass substrate is provided, which may include the following steps:

providing a glass base material preset with n substrate areas and a skeleton area surrounding the substrate areas, wherein n is greater than or equal to 1;

at least forming an etching protection layer on an upper surface and a lower surface of the substrate area of the glass base material, respectively;

at least etching the skeleton area of the glass base material to separate the substrate area from the glass base material, and form a stress dissipation edge along an edge of the substrate area; and removing the etching protection layer to get independent glass substrates.

In the present disclosure, a method for manufacturing a display panel is provided, including the method for manufacturing an ultra-thin glass substrate.

BRIEF DESCRIPTION OF THE DRAWINGS

The foregoing and other features, and advantages of the invention are apparent from the following detailed description taken in conjunction with the accompanying drawings in which.

DETAILED DESCRIPTION

In the following, embodiments of the present disclosure will be described in detail with reference to the figures. The concept of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to those skilled in the art fully. Same reference signs in the figures refer to same or similar elements, so repeated description of them will be omitted.

Figure 1:
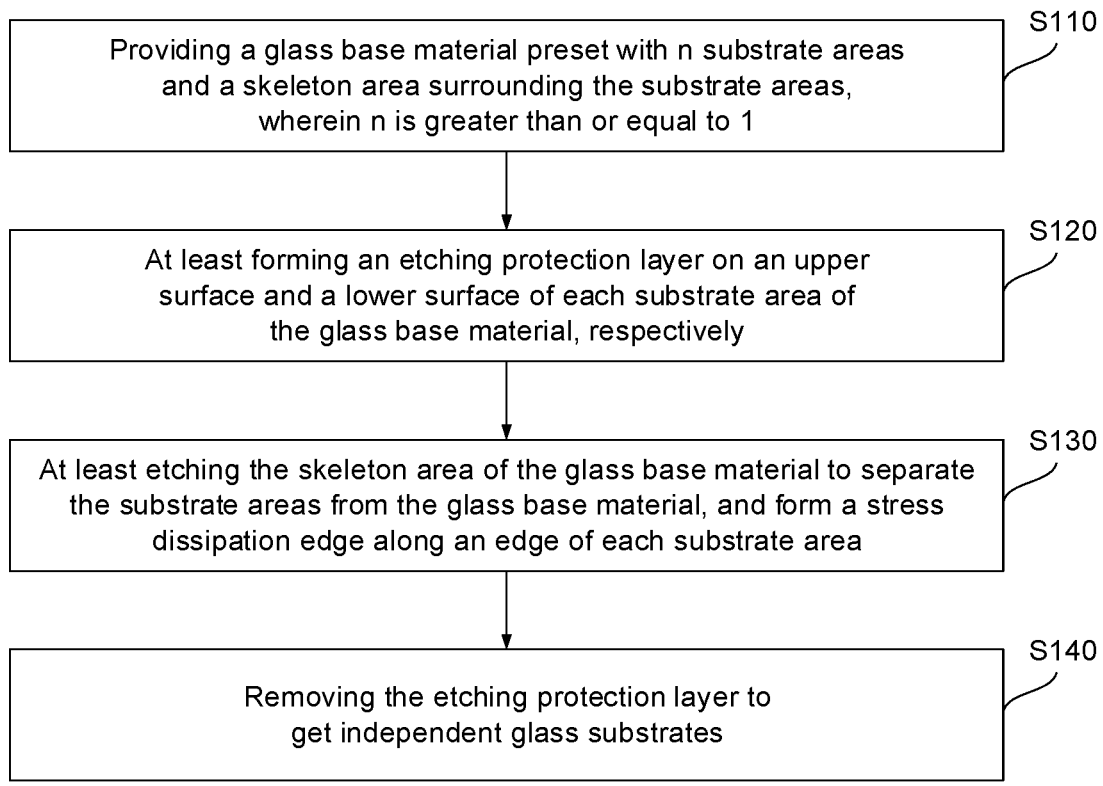
FIG. 1 is a flow chart showing a first embodiment of the method for manufacturing an ultra-thin glass substrate of the present disclosure.

FIG. 1 is a flow chart showing a first embodiment of the method for manufacturing an ultra-thin glass substrate of the present disclosure. As shown in FIG. 1, the method for manufacturing an ultra-thin glass substrate of the present disclosure includes following steps:

S110: providing a glass base material 1 preset with n substrate areas 11 and a skeleton area 12 surrounding the substrate areas 11, wherein n is greater than or equal to 1;

S120: at least forming an etching protection layer on an upper surface and a lower surface of the substrate area 11 of the glass base material 1, respectively;

S130: at least etching the skeleton area 12 of the glass base material 1 to separate the substrate area 11 from the glass base material 1, and form a stress dissipation edge along an edge of the substrate area 11; in the embodiment, the etching is performed by dry etching or wet etching in chemical etching; and S140: removing the etching protection layer to get independent glass substrates 14.

During the manufacturing process per an embodiment of the present disclosure, a scribing wheel and laser are not needed, therefore damage caused by a scribing wheel cutting or laser cutting to quality of the ultra-thin glass substrates can be prevented, steps of manufacturing the glass substrates are simplified, processing speed of the glass substrates is accelerated, and stress dissipation effect of the edges of the substrate areas are reinforced, and the quality of the ultra-thin glass substrate is improved.

In an embodiment, the step S120 includes the following steps:

S121: forming a polymeric reinforcing layer 24 on at least one side of the upper surface and the lower surface of each substrate area 11 of the glass base material, wherein components of the polymeric reinforcing layer 24 include acrylic, organic polymer material containing silicon (silane, silicone, silicon rubber), epoxy resin, fluororesin, polyamide, polyimide, polycarbonate (PC), polyethylene terephthalate (PET) and poly-1,4-cyclohexanedimethyl terephthalate (PCT);

S122: forming the etching protection layer on one side of the polymeric reinforcing layer 24 departing from the substrate areas 11, so that when the glass substrate 14 is bended and recovered, the flexibility of the whole glass substrate 14 is enhanced, and the glass substrate 14 can be better prevented from fragmentation.

In an embodiment, the step S120 includes following steps:

S123: forming a panel function layer 23 on at least one side of the upper surface and the lower surface of each substrate area 11 of the glass base material, wherein the panel function layer 23 includes one of a TFT rear panel, an organic light emitting layer, a touch detection layer, a fingerprint identification layer, and a cover plate or a combination thereof; and S124: forming an etching protection layer on one side of the panel function layer 23 departing from the substrate area 11.

In an embodiment, by using a first etching process, the whole skeleton area 12 of the glass base material 1 is removed, and the substrate areas 11 protected by the etching protection layer are reserved. By using a second etching process, the stress dissipation edge is formed along the edge of each substrate area 11.

In an embodiment, by using one etching process, the whole skeleton area 12 of the glass base material 1 is removed, and the stress dissipation edge 13 is formed along the edge of each substrate area 11, but the present disclosure is not limited to this.

In an embodiment, the etching protection layer only covers the upper surface and the lower surface of each substrate area 11, an upper surface and a lower surface of the skeleton area 12 are both not covered by the etching protection layer, but the present disclosure is not limited to this.

In an embodiment, one side of the glass base material 1 is fully covered by the etching protection layer, on the other side of the glass base material 1, only the substrate areas 11 are covered by the etching protection layer, and the skeleton area 12 is not covered by the etching protection layer, but the present disclosure is not limited to this.

In the embodiment, the etching is performed with acid liquid, for example, the acid liquid is one of the following kinds of solutions: (1) HF+H2SO4+CH3COOH, (2) HF+HNO3+H2O, (3) HF+H2O+NHAF mixed with HF as a main part, solution mixed with ammonia fluoride or sodium fluoride as a main part and added with HCL, acetic acid solution. In an alternative embodiment, the etching can also be performed with alkaline liquid such as phosphate+alkaline solution, or the etching can also be performed in a way of plasma etching or abrasive blasting.

In an embodiment, the substrate areas 11 are arranged in a rectangle shape, adjacent substrate areas 11 are separated from each other by the skeleton area 12, but the present disclosure is not limited to this.

In an embodiment, the stress dissipation edge 13 is a circular-arc edge, a blade edge, or a polygonal edge, the blade edge or the polygonal edge includes at least one straight hypotenuse or arcuate hypotenuse, an angle between the hypotenuse and the glass base material 1 ranges from 15° to 90°, but the present disclosure is not limited to this.

In an embodiment, a thickness of the glass base material 1 ranges from 10 um to 150 um, but the present disclosure is not limited to this.

In an embodiment, the stress dissipation edge 13 surrounds the edge of each substrate area 11, and a width of the stress dissipation edge ranges from 5 um to 300 um, but the present disclosure is not limited to this.

In an embodiment, after the step S140, the method further includes a step S150: forming a polymeric reinforcing layer 24 on at least one side of an upper surface and a lower surface of the glass substrate 14, wherein components of the polymeric reinforcing layer 24 include acrylic, organic polymer material containing silicon, epoxy resin, fluororesin, polyamide, polyimide, polycarbonate, polyethylene terephthalate and poly-1,4-cyclohexanedimethyl terephthalate.

The present disclosure, per an embodiment, further provides a method for manufacturing a display panel, including the method for manufacturing an ultra-thin glass substrate.

FIGS. 2-11 are schematic views of a first embodiment of manufacturing process of the method for manufacturing an ultra-thin glass substrate of the present disclosure. As shown in FIGS. 2-11, the first embodiment of manufacturing process of the ultra-thin glass substrate 14 includes the following processes.

Figure 2:
FIGS. 2-11 are schematic views of a first embodiment of a manufacturing process of the method for manufacturing an ultra-thin glass substrate of the present disclosure.

As shown in FIG. 2, firstly a glass base material 1 is provided, the width of the glass base material 1 ranges from 10 um to 150 um.

Figure 3:
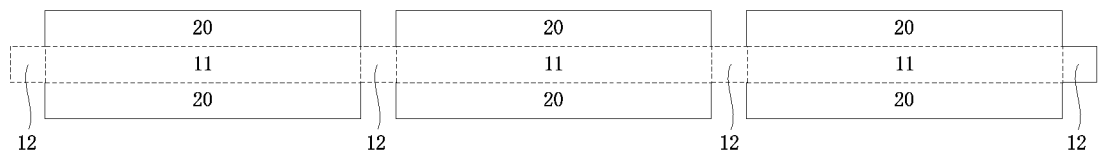
Figure 4:
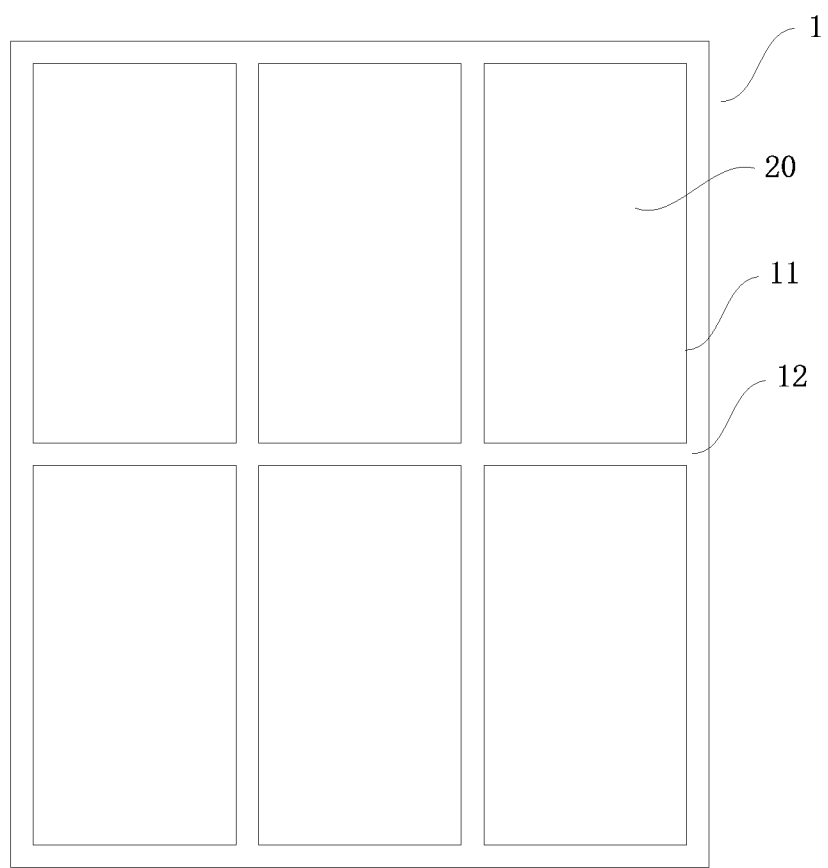
Figure 5:
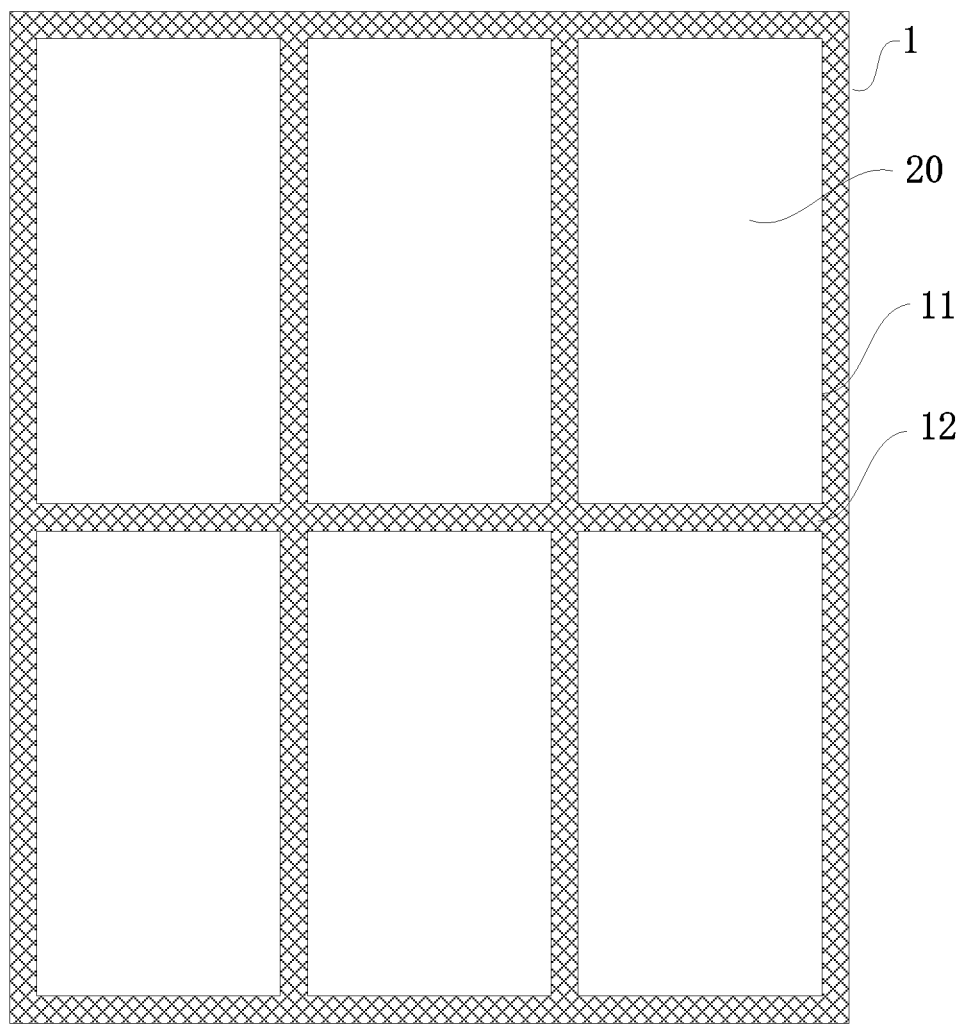
Figure 6:
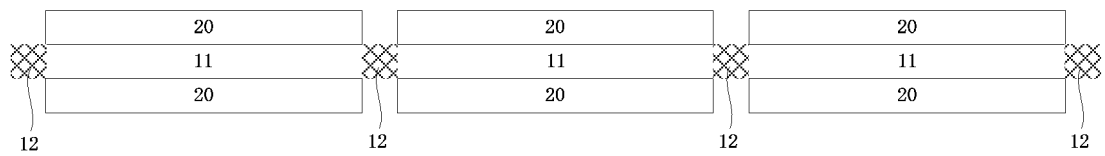
Figure 7:
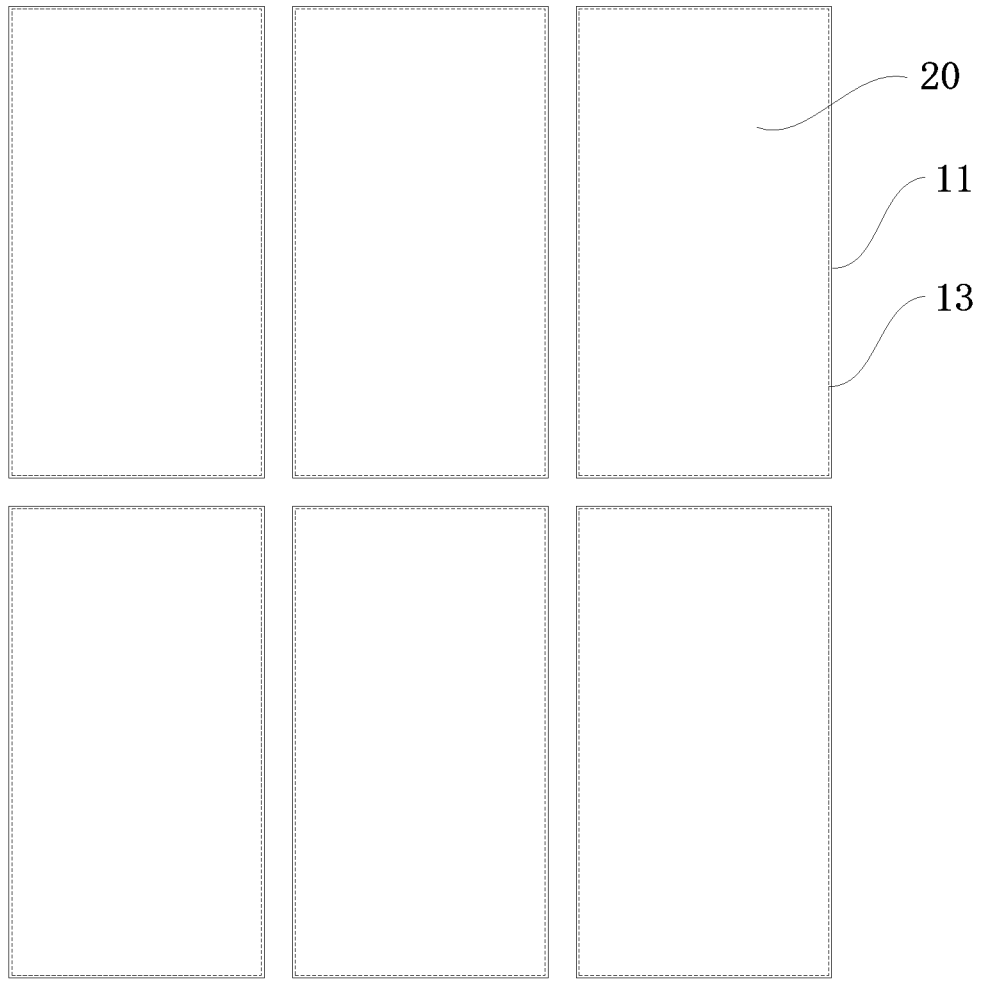
Figure 8:
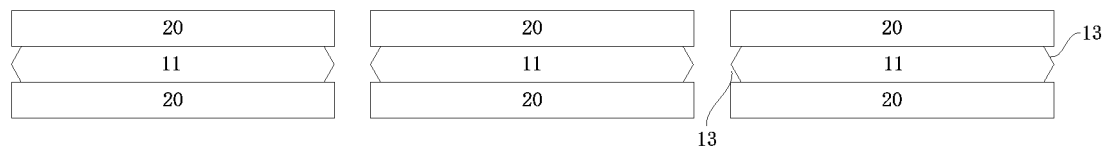

As shown in FIGS. 3 and 4, n substrate areas 11 and a skeleton area 12 surrounding the substrate areas 11 are preset on the glass base material 1, wherein n is greater than or equal to 1, and at least an etching protection layer 20 is formed on an upper surface and a lower surface of each substrate area 11 of the glass base material 1, respectively. The etching protection layer 20 only covers the upper surface and the lower surface of each substrate area 11, an upper surface and a lower surface of the skeleton area 12 are both not covered by the etching protection layer 20. Therefore, the upper surface and the lower surface of the skeleton area 12 can be both etched at the same time during the following etching process, and a stress dissipation edge having a plurality of stress dissipation surfaces can be easily formed. The substrate areas 11 are arranged in a rectangle shape on the glass base material 1, adjacent substrate areas 11 are separated from each other by the skeleton area 12.

As shown in FIGS. 5, 6, 7, 8, the skeleton area 12 of the glass base material 1 is etched, to separate the substrate area 11 from the glass base material 1, and form a stress dissipation edge 13 along an edge of each substrate area 11. In the embodiment, by using a first etching process, the whole skeleton area 12 of the glass base material 1 is removed, and the substrate areas 11 protected by the etching protection layer 20 are reserved. The stress dissipation edge 13 is a blade edge, the stress dissipation edge 13 surrounds the edge of the substrate area 11, and a width of the stress dissipation edge 13 ranges from 5 um to 300 um.

Figure 9:
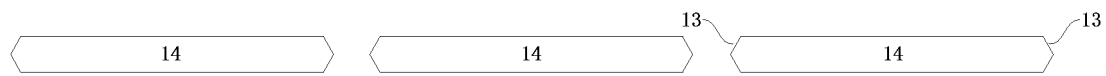

At last, as shown in FIG. 9, the etching protection layer 20 is removed to get independent glass substrates 14.

Figure 10:
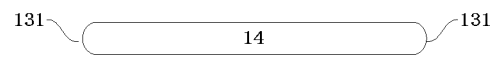

As shown in FIG. 10, in an alternative embodiment, the stress dissipation edge 131 is a circular-arc edge, to dissipate stress along a plurality of different directions, and better prevent the glass substrate 14 from fragmentation.

Figure 11:
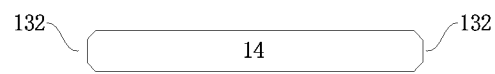

As shown in FIG. 11, in an alternative embodiment, the stress dissipation edge 132 is a triangle edge, to dissipate stress along a plurality of different directions, and better prevent the glass substrate 14 from fragmentation.

Figure 12:
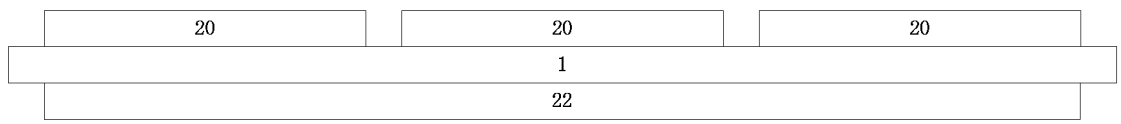
FIGS. 12-14 are schematic views of a second embodiment of a manufacturing process of the method for manufacturing an ultra-thin glass substrate of the present disclosure.
Figure 13:
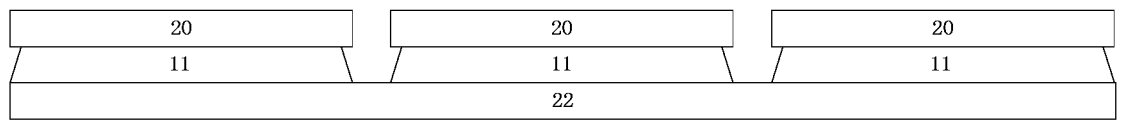
Figure 14:
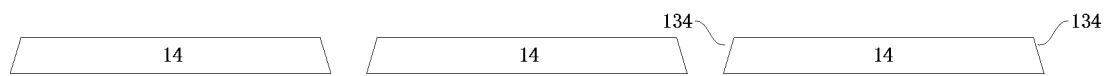

FIGS. 12-14 are schematic views of a second embodiment of manufacturing process of the method for manufacturing an ultra-thin glass substrate of the present disclosure. As shown in FIGS. 12-14, in an alternative embodiment, based on the above manufacturing process, during the process of forming an etching protection layer on the upper layer and the lower layer of the substrate area 11, respectively, one side of the glass base material 1 is fully covered by the etching protection layer 22, on the other side of the glass base material 1, only the substrate areas 11 are covered by the etching protection layer 20, the skeleton area 12 is not covered by the etching protection layer 20. Therefore, during the etching process, the side of the glass base material 1 fully covered by the etching protection layer is not etched, only the other side is etched, to form a stress dissipation edge 133 in a sloped shape along an edge of each glass substrate 14.

Figure 15:
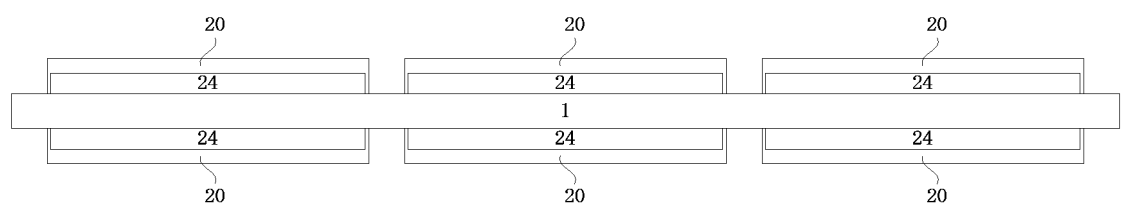
FIGS. 15-17 are schematic views of a third embodiment of a manufacturing process of the method for manufacturing an ultra-thin glass substrate of the present disclosure.
Figure 16:
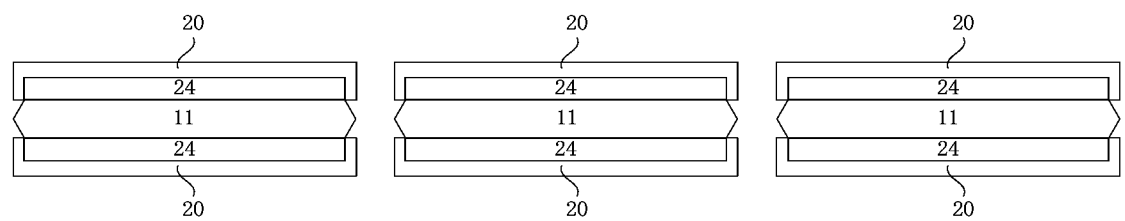
Figure 17:
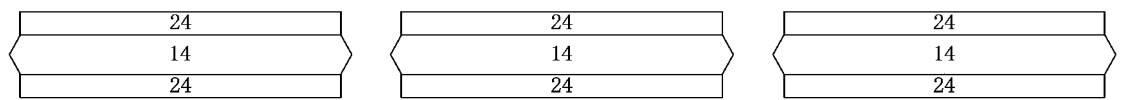

FIGS. 15-17 are schematic views of a third embodiment of manufacturing process of the method for manufacturing an ultra-thin glass substrate of the present disclosure. As shown in FIGS. 15-17, in an alternative embodiment, based on the above manufacturing process, during the process of forming an etching protection layer on the upper layer and the lower layer of the substrate area 11, respectively, a polymeric reinforcing layer 24 is formed on at least one side of the upper surface and the lower surface of each substrate area 11 of the glass base material. The etching protection layer is formed on one side of polymeric reinforcing layer 24 departing from the substrate area 11, to get the glass substrates 14 at last, and the upper surface and the lower surface of the glass substrates 14 are covered by the polymeric reinforcing layer 24. Therefore, when the glass substrate 14 is bended or recovered, the flexibility of the whole glass substrate 14 is enhanced, and the glass substrate 14 can be better prevented from fragmentation.

In an alternative embodiment, based on the above manufacturing process, during the process of forming an etching protection layer on the upper layer and the lower layer of the substrate area 11, respectively, a panel function layer 23 is formed on at least one side of the upper surface and the lower surface of each substrate area 11 of the glass base material 1, wherein the panel function layer 23 includes one of a TFT rear panel, an organic light emitting layer, a touch detection layer, a fingerprint identification layer, and a cover plate or a combination thereof, and the etching protection layer is formed on one side of the panel function layer 23 departing from the substrate area 11.

Figure 18:
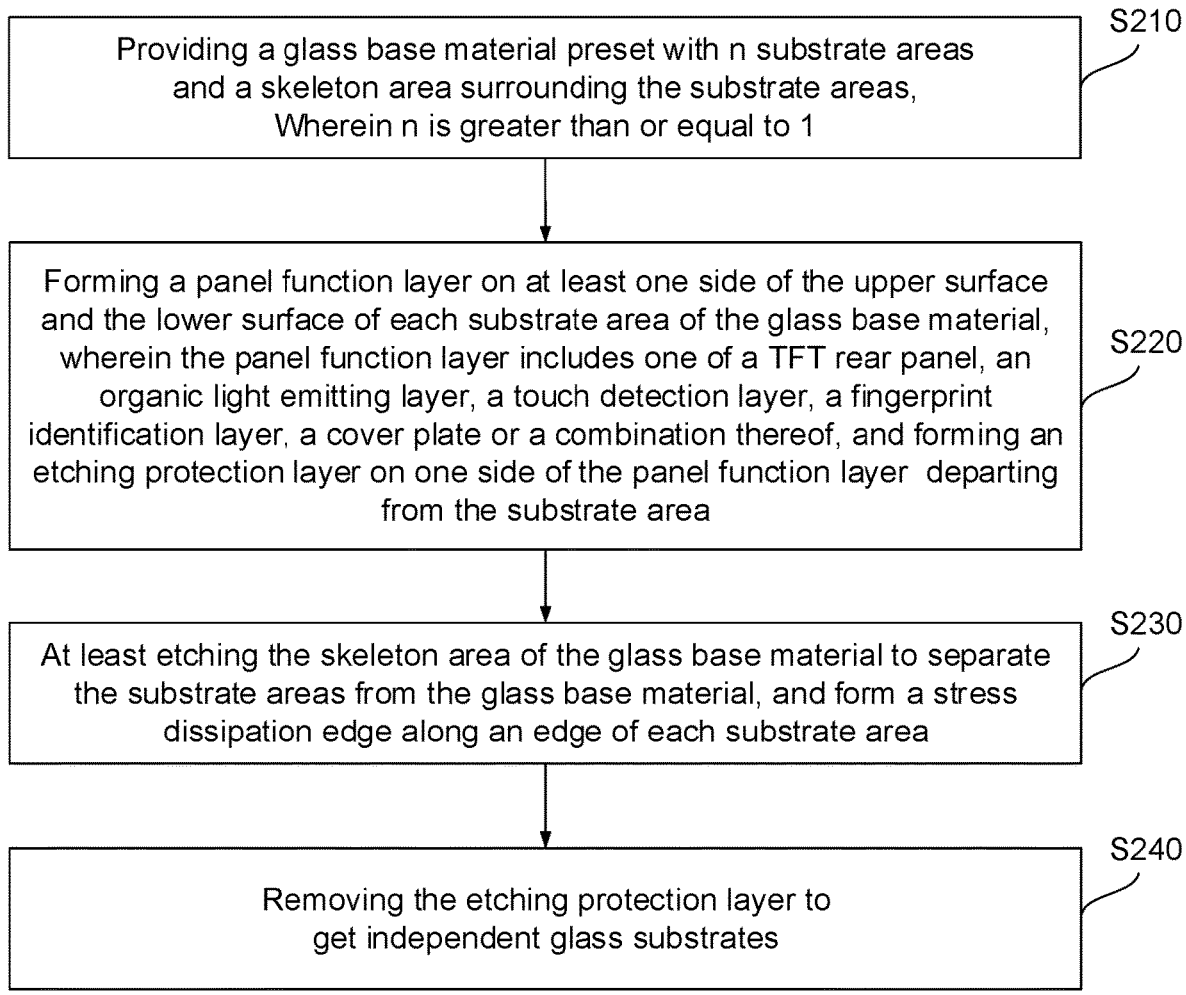
FIG. 18 is a flow chart showing a second embodiment of the method for manufacturing an ultra-thin glass substrate of the present disclosure.

FIG. 18 is a flow chart showing a second embodiment of the method for manufacturing an ultra-thin glass substrate of the present disclosure. In the second embodiment, the ways of implementing the steps S110, S120, S130 and S140 are different from those of the first embodiment. To distinguish the steps in the second embodiment with the steps in the first embodiment, the steps S110, S120, S130 and S140 in the second embodiment are indicated as steps S210, S220, S230, S240. As shown in FIG. 18, the method for manufacturing an ultra-thin glass substrate includes following steps:

S210: providing a glass base material 1 preset with n substrate areas 11 and a skeleton area 12 surrounding the substrate areas 11, wherein n is greater than or equal to 1;

S220: forming a panel function layer 23 on at least one side of the upper surface and the lower surface of each substrate area 11 of the glass base material 1, wherein the panel function layer 23 includes one of a TFT rear panel, an organic light emitting layer, a touch detection layer, a fingerprint identification layer, and a cover plate or a combination thereof, and forming an etching protection layer on one side of the panel function layer 23 departing from the substrate area 11;

S230: at least etching the skeleton area 12 of the glass base material 1 to separate the substrate areas 11 from the glass base material 1, and form a stress dissipation edge 13 along an edge of each substrate area 11;

S240: removing the etching protection layer to get independent glass substrates 14.

During the manufacturing process per an embodiment of the present disclosure, a scribing wheel and laser are not needed, therefore damage caused by a scribing wheel cutting or laser cutting to quality of the ultra-thin glass substrates can be prevented. The panel function layer 23 can be formed directly on the substrate areas 11 of the glass base material 1 when acquiring the glass substrates 14 from the glass base material 1. Damage caused by scribing wheel cutting or laser cutting to the formed panel function layer 23 can also be prevented, time of following manufacturing process is saved, processing speed of the glass substrate 14 is accelerated, stress dissipation effect of the edges of the substrate areas 11 is enhanced, and the quality of the ultra-thin glass substrate is improved.

In an embodiment, the step S220 includes following steps:

S221: forming a polymeric reinforcing layer 24 on at least one side of the upper surface and the lower surface of each substrate area 11 of the glass base material;

S222: forming a panel function layer 23 on one side of the polymeric reinforcing layer 24 departing from the substrate area 11, wherein the panel function layer 23 at least includes a TFT rear panel, an organic light emitting layer and a touch detection layer stacked in sequence on the substrate areas 11, and forming an etching protection layer on one side of the panel function layer 23 departing from the substrate area 11. Therefore, when the glass substrate 14 is bended or recovered, the flexibility of the whole glass substrate 14 is enhanced, and the glass substrate 14 can be better prevented from fragmentation.

In an embodiment, the etching protection layer covers a surface of the panel function layer 23 departing from the substrate area 11 and four side surfaces of the panel function layer 23, but the present disclosure is not limited to this.

In an embodiment, by using a first etching process, the whole skeleton area 12 of the glass base material 1 is removed, and the substrate areas 11 protected by the etching protection layer are reserved; by using a second etching process, the stress dissipation edge 13 is formed along the edge of each substrate area 11, but the present disclosure is not limited to this.

In an embodiment, by using one etching process, the whole skeleton area 12 of the glass base material 1 is removed, and the stress dissipation edge 13 is formed along the edge of each substrate area 11, but the present disclosure is not limited to this.

In an embodiment, the etching protection layer only covers the upper surface and the lower surface of each substrate area 11, an upper surface and a lower surface of the skeleton area 12 are both not covered by the etching protection layer, but the present disclosure is not limited to this.

In another embodiment, one side of the glass base material 1 is fully covered by the etching protection layer, on the other side of the glass base material 1, only the substrate areas 11 are covered by the etching protection layer, and the skeleton area 12 is not covered by the etching protection layer, but the present disclosure is not limited to this.

In an embodiment, the substrate areas 11 are arranged in a rectangle shape on the glass base material 1, adjacent substrate areas 11 are separated from each other by the skeleton area 12, but the present disclosure is not limited to this.

In an embodiment, the stress dissipation edge is a circular-arc edge, a blade edge, or a polygonal edge, the blade edge or the polygonal edge includes at least one straight hypotenuse or arcuate hypotenuse, an angle between the hypotenuse and the glass base material 1 ranges from 15° to 90°, but the present disclosure is not limited to this.

In an embodiment, a thickness of the glass base material 1 ranges from 10 μm to 150 μm, but the present disclosure is not limited to this. The stress dissipation edge 13 surrounds the edge of each substrate area 11, and a width of the stress dissipation edge 13 ranges from 5 μm to 300 μm, but the present disclosure is not limited to this.

In an embodiment, after the step S240, the method further includes a step S250: forming a polymeric reinforcing layer on at least one side of an upper surface and a lower surface of the glass substrate 14, wherein components of the polymeric reinforcing layer 24 include acrylic, organic polymer material containing silicon, epoxy resin, fluororesin, polyamide, polyimide, polycarbonate, polyethylene terephthalate and poly-1,4-cyclohexanedimethyl terephthalate.

The present disclosure, per an embodiment, further provides a method for manufacturing a display panel, including the method for manufacturing an ultra-thin glass substrate.

FIGS. 19-22 are schematic views of a fourth embodiment of manufacturing process of the method for manufacturing an ultra-thin glass substrate of the present disclosure. As shown in FIGS. 19-22, the fourth embodiment of manufacturing process of the ultra-thin glass substrate 14 includes the following processes.

Figure 19:
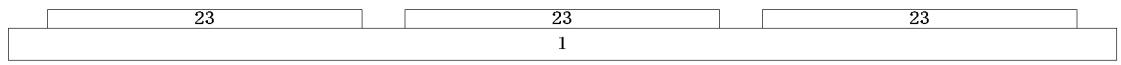
FIGS. 19-22 are schematic views of a fourth embodiment of a manufacturing process of the method for manufacturing an ultra-thin glass substrate of the present disclosure.
Figure 20:
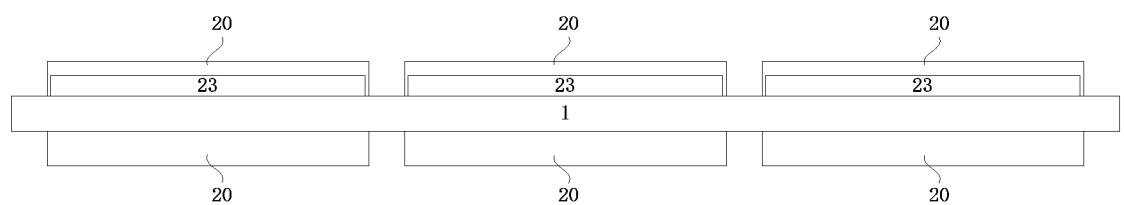

As shown in FIGS. 19 and 20, firstly a glass base material 1 is provided, n substrate areas 11 and a skeleton area 12 surrounding the substrate areas 11 are preset on the glass base material 1, wherein n is greater than or equal to 1. The width of the glass base material 1 ranges from 10 μm to 150 μm. The substrate areas 11 are arranged in a rectangle shape on the glass base material 1, adjacent substrate areas 11 are separated from each other by the skeleton area 12. A panel function layer 23 is formed on an upper surface of the substrate area 11, the panel function layer 23 at least includes one of a TFT rear panel, an organic light emitting layer, a touch detection layer, a fingerprint identification layer, and a cover plate or a combination thereof. An etching protection layer 20 is formed on one side of the glass base material 1 without the panel function layer 23 and one side of the panel function layer 23 departing from the substrate area 11, respectively.

Figure 21:
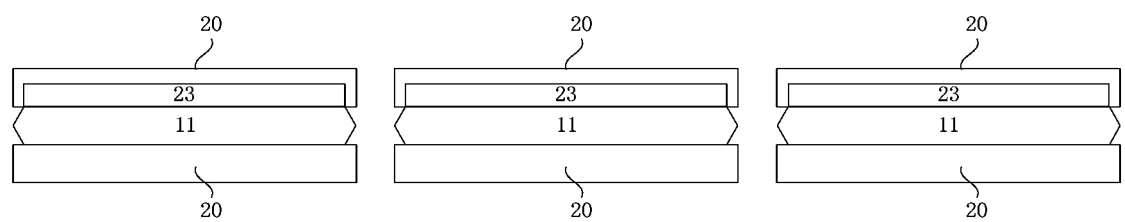

As shown in FIG. 21, at least the skeleton area 12 of the glass base material 1 is etched, to separate the substrate area 11 from the glass base material 1, and form a stress dissipation edge 13 along an edge of each substrate area 11.

Figure 22:
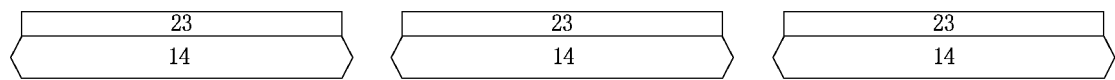

As shown in FIG. 22, the etching protection layer is removed to acquire independent glass substrates 14.

In the present disclosure, per an embodiment, the panel function layer can be formed directly on a plurality of areas (corresponding to a plurality of display panels acquired in the following process) of the glass base material 1 when acquiring the glass substrates 14 from the glass base material 1. The time of the following manufacturing process is greatly saved. As scribing wheel and laser are not needed in the following process of separating the glass substrates 14, damage caused by scribing wheel cutting or laser cutting to the formed panel function layer 23 can be prevented, therefore processing speed of the display panel is accelerated, and product quality of the display panel is improved.

Figure 23:
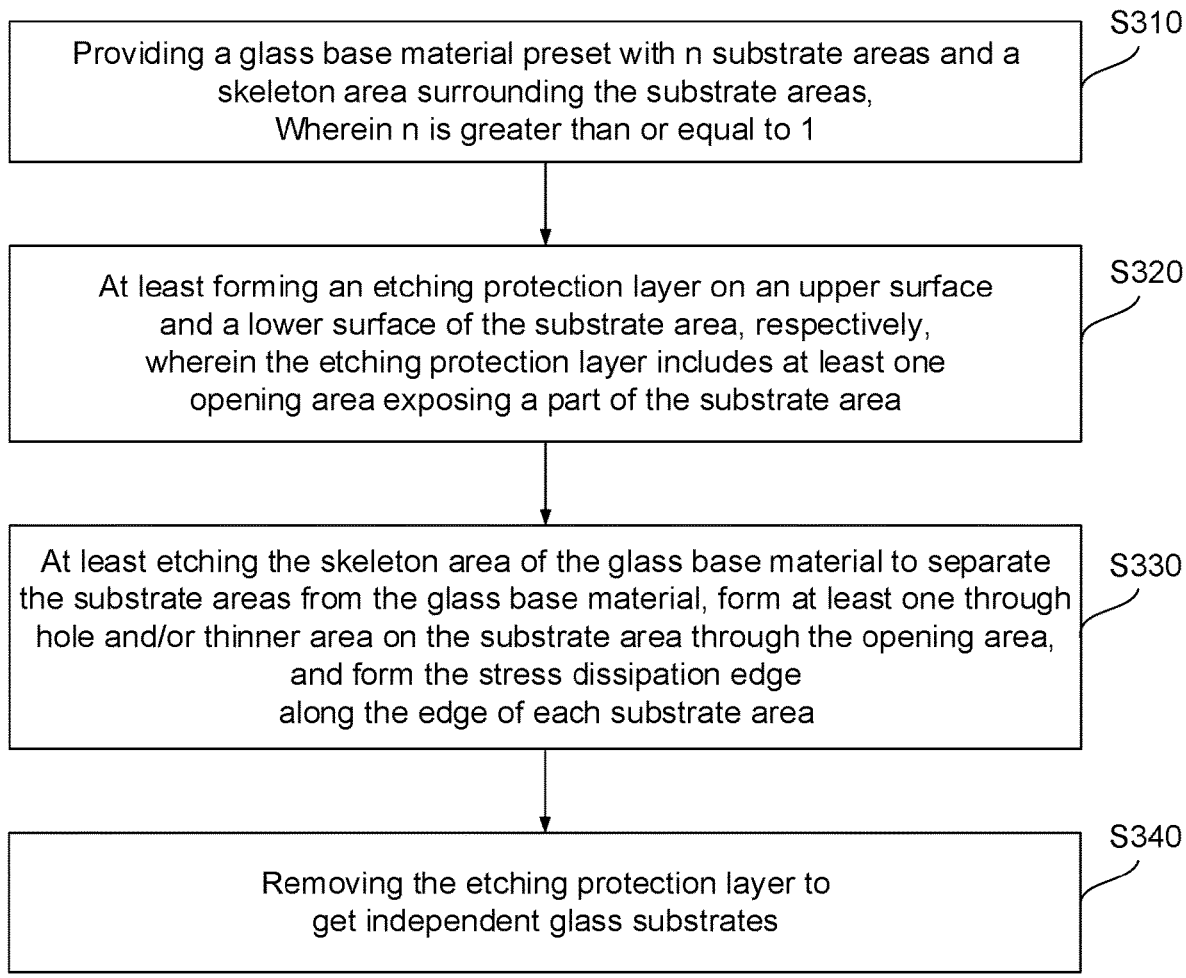
FIG. 23 is a flow chart showing a third embodiment of the method for manufacturing an ultra-thin glass substrate of the present disclosure.

FIG. 23 is a flow chart showing a third embodiment of the method for manufacturing an ultra-thin glass substrate. In the third embodiment, the ways of implementing the steps S110, S120, S130 and S140 are different from those of the first embodiment. To distinguish the steps in the third embodiment with the steps in the first embodiment, the steps S110, S120, S130 and S140 in the third embodiment are indicated as steps S310, S320, S330, S340. As shown in FIG. 23, the method for manufacturing an ultra-thin glass substrate includes following steps:

S310: providing a glass base material 1 preset with n substrate areas 11 and a skeleton area 12 surrounding the substrate areas 11, wherein n is greater than or equal to 1;

S320: at least forming an etching protection layer on an upper surface and a lower surface of the substrate area 11, respectively, wherein the etching protection layer includes at least one opening area exposing a part of the substrate area 11;

S330: at least etching the skeleton area 12 of the glass base material 1 to separate the substrate areas 11 from the glass base material 1, form at least one through hole and/or thinner area on the substrate area 11 through the opening area, and form the stress dissipation edge 13 along the edge of each substrate area 11; and S340: removing the etching protection layer to get independent glass substrates 14.

During the manufacturing process per an embodiment of the present disclosure, scribing wheel and laser are not needed, therefore damage caused by scribing wheel cutting or laser cutting to quality of the ultra-thin glass substrates can be prevented. The through hole and/or the thinner area can be formed on a plurality of substrate areas 11 of the glass base material 1 when acquiring the glass substrates 14 from the glass base material 1. The damage caused by laser drilling to the glass substrate 14 is also prevented, time of the following manufacturing process is saved, processing speed of the glass substrates is accelerated, stress dissipation effect of the edges of the substrate areas is enhanced, and quality of the ultra-thin glass substrate is improved. In the following process, the through hole can be used to install an acoustical sensor or an optical sensor, a lower surface of the thinner area is provided with a fingerprint sensor, but the present disclosure is not limited to this.

In an embodiment, by using a first etching process, the whole skeleton area 12 of the glass base material 1 is removed, and the substrate areas 11 protected by the etching protection layer are reserved, but the present disclosure is not limited to this.

By using a second etching process, at least one through hole and/or thinner area is formed on each substrate area 11, and the stress dissipation edge 13 is formed along the edge of each substrate area 11, but the present disclosure is not limited to this.

In an embodiment, by using one etching process, the whole skeleton area 12 of the glass base material 1 is removed, at least one through hole and/or thinner area is formed on each substrate area 11, and the stress dissipation edge 13 is formed along the edge of each substrate area 11, but the present disclosure is not limited to this.

In an embodiment, the step S320 includes following steps:

S321: forming a polymeric reinforcing layer 24 on at least one side of the upper surface and the lower surface of each substrate area 11 of the glass base material;

S322: forming an etching protection layer on one side of the polymeric reinforcing layer 24 departing from the substrate area 11, wherein the etching protection layer includes at least one opening area exposing a part of the substrate area 11. Therefore, when the glass substrate 14 is bended or recovered, the flexibility of the whole glass substrate 14 is enhanced, and the glass substrate 14 can be better prevented from fragmentation.

In an embodiment, the step S320 includes following steps:

S323: forming a panel function layer 23 on at least one side of the upper surface and the lower surface of each substrate area 11 of the glass base material 1, wherein the panel function layer 23 includes one of a TFT rear panel, an organic light emitting layer, a touch detection layer, a fingerprint identification layer, and a cover plate or a combination thereof;

S324: forming an etching protection layer on one side of the panel function layer 23 departing from the substrate area 11, wherein the etching protection layer includes at least one opening area exposing a part of the substrate area 11.

In an embodiment, the substrate areas 11 are arranged in a rectangle shape on the glass base material 1, adjacent substrate areas 11 are separated from each other by the skeleton area 12, but the present disclosure is not limited to this.

In an embodiment, the opening area is any one of a circular hole, an oval hole, a water drop-shaped hole and an irregular hole, but the present disclosure is not limited to this.

In an embodiment, the stress dissipation edge 13 is a circular-arc edge, a blade edge, or a polygonal edge, the blade edge or the polygonal edge includes at least one straight hypotenuse or arcuate hypotenuse, an angle between the hypotenuse and the glass base material 1 ranges from 15° to 90°, but the present disclosure is not limited to this.

In an embodiment, a thickness of the glass base material 1 ranges from 10 um to 150 um, but the present disclosure is not limited to this.

The stress dissipation edge 13 surrounds the edge of each substrate area 11, and a width of the stress dissipation edge 13 ranges from 5 um to 300 um, but the present disclosure is not limited to this.

In an embodiment, after the step S340, the method further includes a step S350: forming a polymeric reinforcing layer 24 on at least one side of an upper surface and a lower surface of the glass substrate 14, wherein components of the polymeric reinforcing layer 24 include acrylic, organic polymer material containing silicon, epoxy resin, fluororesin, polyamide, polyimide, polycarbonate, polyethylene terephthalate and poly-1,4-cyclohexanedimethyl terephthalate.

In an embodiment, the through hole is a hole 15 used to install a camera.

In an embodiment, the thinner area cooperates with a fingerprint sensor.

The present disclosure, per an embodiment, further provides a method for manufacturing a display panel, including the method for manufacturing an ultra-thin glass substrate. The through hole is used to install an acoustical sensor or an optical sensor, a lower surface of the thinner area is provided with a fingerprint sensor.

FIGS. 24-29 are schematic views of a fifth embodiment of manufacturing process of the method for manufacturing an ultra-thin glass substrate of the present disclosure. As shown in FIGS. 24-29, the fifth embodiment of manufacturing process of the ultra-thin glass substrate 14 includes the following processes.

Figure 24:
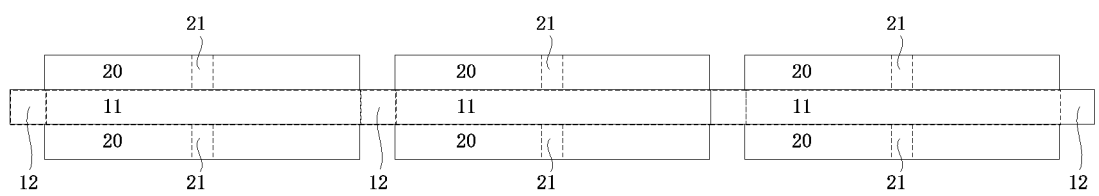
FIGS. 24-29 are schematic views of a fifth embodiment of a manufacturing process of the method for manufacturing an ultra-thin glass substrate of the present disclosure.
Figure 25:
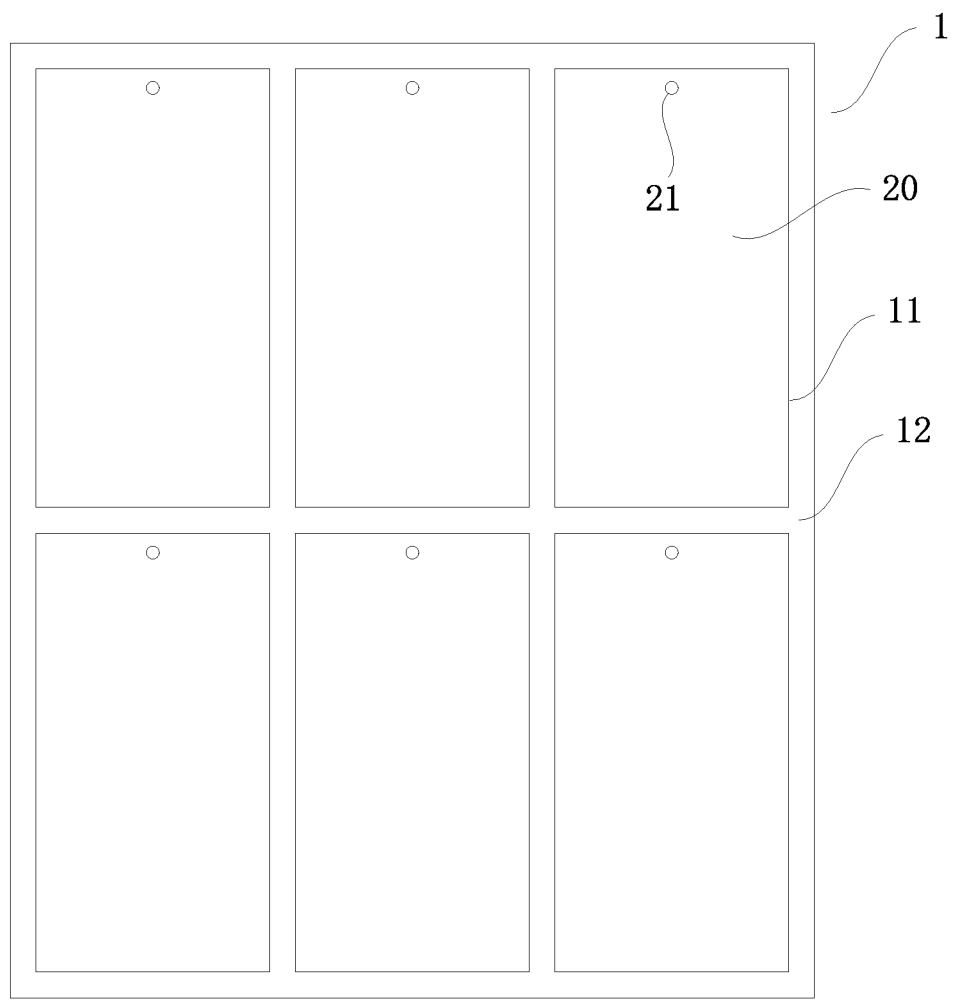

As shown in FIGS. 24 and 25, firstly a glass base material 1 is provided, n substrate areas 11 and a skeleton area 12 surrounding the substrate areas 11 are preset on the glass base material 1, wherein n is greater than or equal to 1. The width of the glass base material 1 ranges from 10 um to 150 um. The substrate areas 11 are arranged in a rectangle shape on the glass base material 1, adjacent substrate areas 11 are separated from each other by the skeleton area 12. At least an etching protection layer 20 is formed on the upper surface and the lower surface of the substrate area 11 of the glass base material 1, respectively. The etching protection layer includes at least one opening area exposing a part of the substrate area 11. In the embodiment, the opening area is a circular hole.

Figure 26:
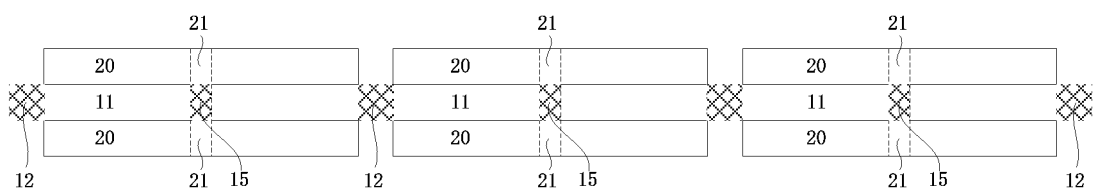
Figure 27:
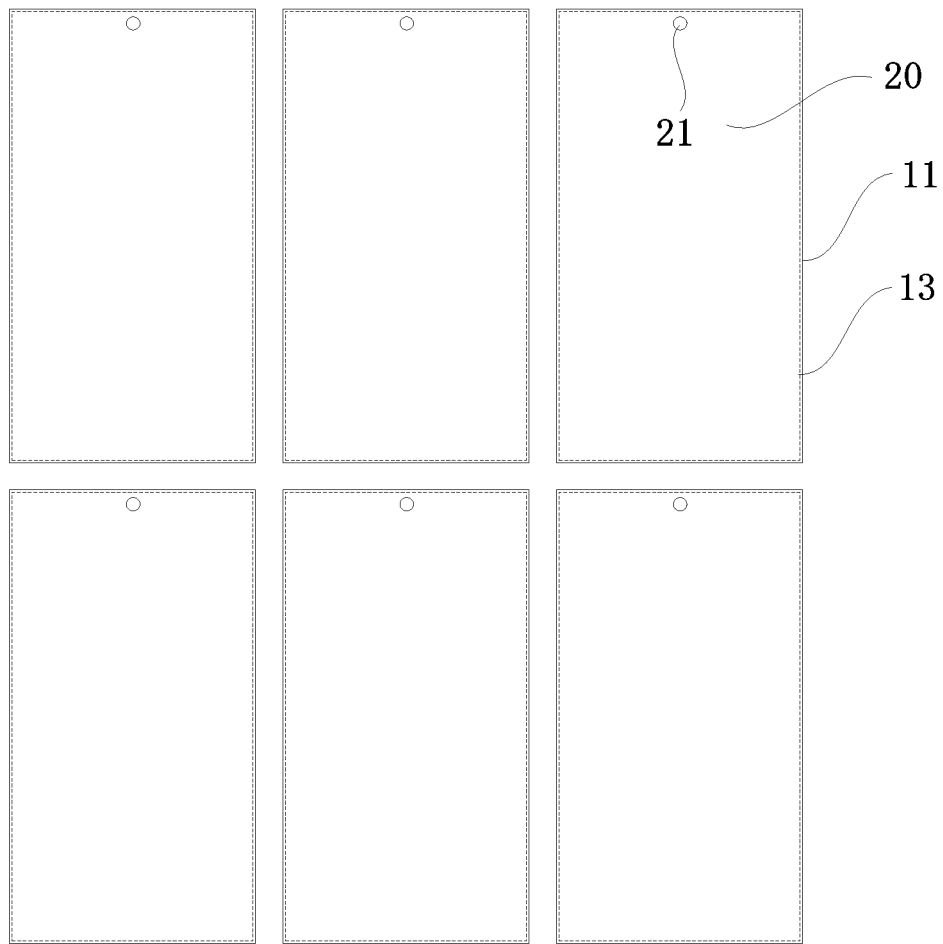

As shown in FIGS. 26 and 27, the skeleton area 12 of the glass base material 1 is etched, to separate the substrate area 11 from the glass base material 1, a hole 15 used to install a camera is formed on substrate area 11 through the opening area, and a stress dissipation edge 13 is formed along an edge of each substrate area 11.

Figure 28:
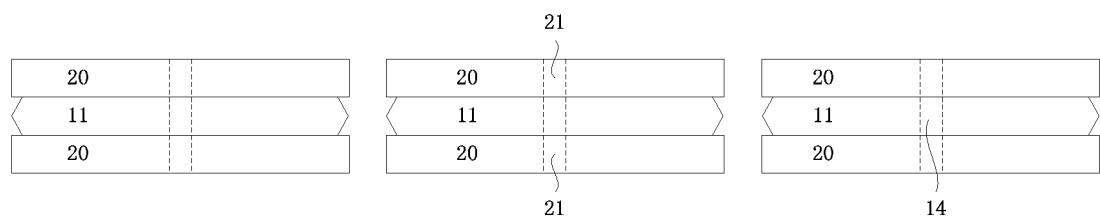
Figure 29:
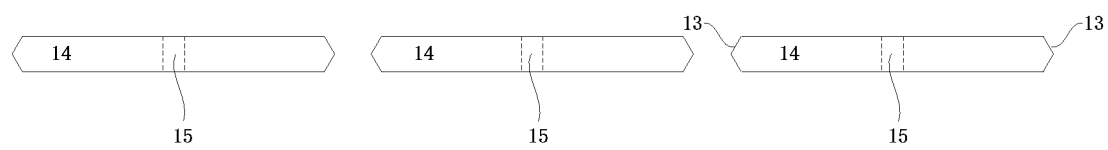

As shown in FIGS. 28 and 29, the etching protection layer 20 is removed to acquire independent glass substrates 14.

In the present disclosure, per an embodiment, the glass base material 1 can be drilled to form the through hole when acquiring the glass substrates 14 from the glass base material 1, to facilitate the installation of the acoustical sensor or the optical sensor in the following process. Time of processing the function layer is saved. The damage caused by laser drilling to the glass substrate 14 can be prevented. Time of the following manufacturing process is greatly saved, processing steps to acquire a glass substrate 14 having a panel function layer 23 are simplified, processing speed of the display panel is accelerated, stress dissipation effect of the edge of the ultra-thin glass is enhanced, and product quality of the display panel is improved.

Figure 30:
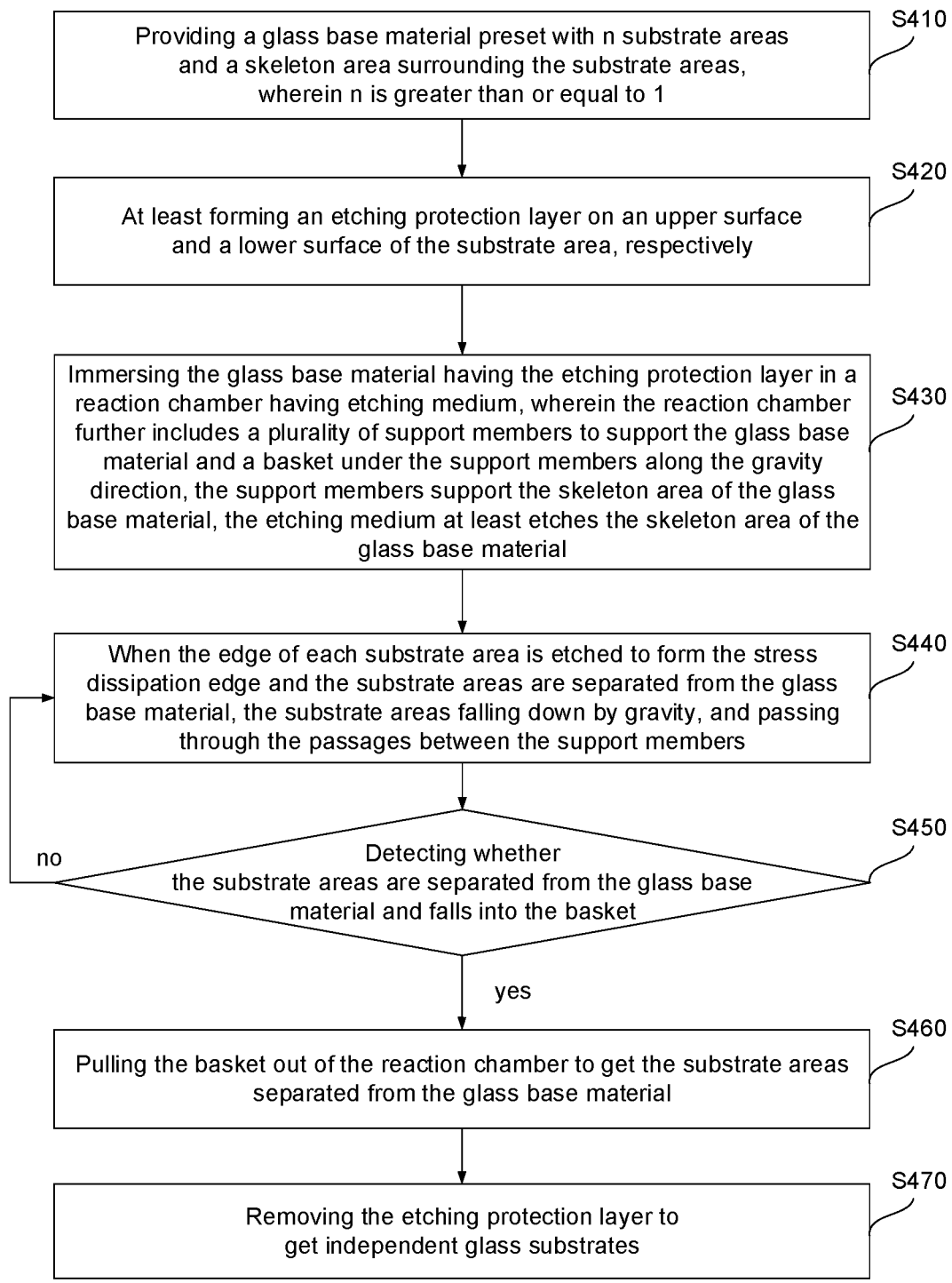
FIG. 30 is a flow chart showing a fourth embodiment of the method for manufacturing an ultra-thin glass substrate of the present disclosure.

FIG. 30 is a flow chart showing a fourth embodiment of the method for manufacturing an ultra-thin glass substrate. As shown in FIG. 30, the method for manufacturing an ultra-thin glass substrate includes following steps:

S410: providing a glass base material 1 preset with n substrate areas 11 and a skeleton area 12 surrounding the substrate areas 11, wherein n is greater than or equal to 1;

S420: at least forming an etching protection layer on an upper surface and a lower surface of the substrate area 11, respectively;

S430: immersing the glass base material 1 having the etching protection layer in a reaction chamber having etching medium, wherein the reaction chamber further includes a plurality of support members 4 to support the glass base material 1 and a basket 5 under the support members 4 along the gravity direction, the support members 4 support the skeleton area 12 of the glass base material 1, the etching medium at least etches the skeleton area 12 of the glass base material 1;

S440: when the edge of each substrate area 11 is etched to form the stress dissipation edge 13 and the substrate areas 11 are separated from the glass base material 1, the substrate areas 11 falling down by gravity, and passing through the passages between the support members 4;

S450: detecting whether the substrate areas 11 are separated from the glass base material 1 and fall into the basket 5, if yes, then processing the step S460, if not, then processing the step S450;

S460: pulling the basket 5 out of the reaction chamber to get the substrate area 11 separated from the glass base material 1;

S470: removing the etching protection layer to get independent glass substrates 14.

In the present disclosure, per an embodiment, the support member is used to support the skeleton area 12 of the glass base material 1, so that the substrate areas 11 fall into the basket 5 after separated from the glass base material 1 by etching, and the basket 5 can take out all the glass substrates 14 at one time. Scribing wheel and laser are not needed, therefore damage caused by scribing wheel cutting or laser cutting to quality of the ultra-thin glass substrates can be prevented, steps of manufacturing the glass substrates are simplified, processing speed of the glass substrates is accelerated, stress dissipation effect of the edges of the substrate areas is reinforced, and the quality of the ultra-thin glass substrate is improved.

In an embodiment, the support members 4 only support the skeleton area 12 of the glass base material 1, the basket 5 has through holes used for the support members 4 going through, a first projection of each gap between the support members 4 on the basket 5 is larger than or equal to a second projection of each substrate area 11 on the basket 5.

In an embodiment, the etching protection layer only covers the upper surface and the lower surface of each substrate area 11, an upper surface and a lower surface of the skeleton area 12 are both not covered by the etching protection layer.

In an embodiment, the step S420 includes following steps:

S421: forming a polymeric reinforcing layer 24 on at least one side of the upper surface and the lower surface of each substrate area 11 of the glass base material;

S422: forming an etching protection layer on one side of the polymeric reinforcing layer 24 departing from the substrate area 11, but the present disclosure is not limited to this.

In an embodiment, the step S420 includes following steps:

S423: forming a panel function layer 23 on at least one side of the upper surface and the lower surface of each substrate area 11 of the glass base material 1, wherein the panel function layer 23 includes one of a TFT rear panel, an organic light emitting layer, a touch detection layer, a fingerprint identification layer, and a cover plate or a combination thereof;

S424: forming an etching protection layer on one side of the panel function layer 23 departing from the substrate area 11, but the present disclosure is not limited to this.

In an embodiment, by using a first etching process, the whole skeleton area 12 of the glass base material 1 is removed, and the substrate areas 11 protected by the etching protection layer are reserved; by using a second etching process, the stress dissipation edge 13 is formed along the edge of each substrate area 11, but the present disclosure is not limited to this.

In another alternative embodiment, by using one etching process, the whole skeleton area 12 of the glass base material 1 is removed, and the stress dissipation edge 13 is formed along the edge of each substrate area 11, but the present disclosure is not limited to this.

In an embodiment, the substrate areas 11 are arranged in a rectangle shape on the glass base material 1, adjacent substrate areas 11 are separated from each other by the skeleton area 12, but the present disclosure is not limited to this.

In an embodiment, the stress dissipation edge 13 is a circular-arc edge, a blade edge, or a polygonal edge, the blade edge or the polygonal edge includes at least one straight hypotenuse or arcuate hypotenuse, and an angle between the hypotenuse and the glass base material 1 ranges from 15° to 90°, but the present disclosure is not limited to this.

In an embodiment, a thickness of the glass base material 1 ranges from 10 μm to 150 μm, but the present disclosure is not limited to this.

The stress dissipation edge 13 surrounds the edge of each substrate area 11, and a width of the stress dissipation edge 13 ranges from 5 μm to 300 μm, but the present disclosure is not limited to this.

The present disclosure, per an embodiment, further provides a method for manufacturing a display panel, including the method for manufacturing an ultra-thin glass substrate.

FIGS. 31-35 are schematic views of a sixth embodiment of manufacturing process of the method for manufacturing an ultra-thin glass substrate of the present disclosure. As shown in FIGS. 31-35, the sixth embodiment of manufacturing process of the ultra-thin glass substrate 14 includes following processes.

Figure 31:
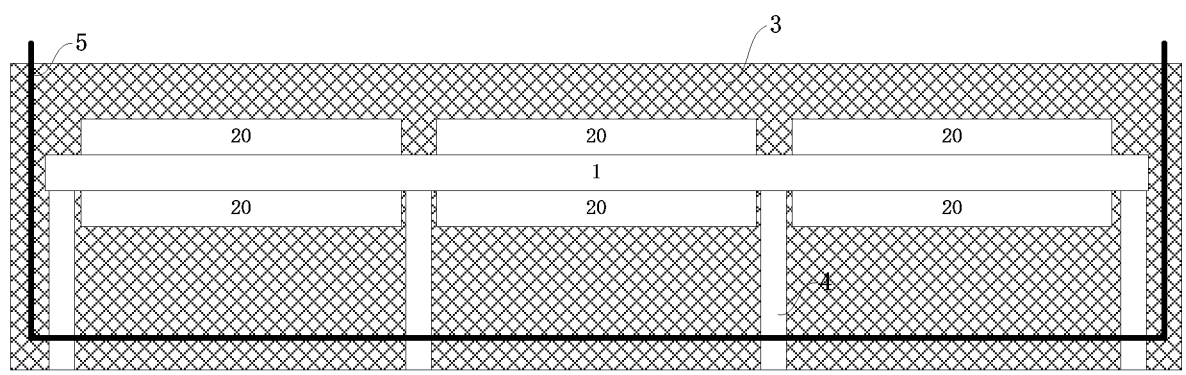
FIGS. 31-35 are schematic views of a sixth embodiment of a manufacturing process of the method for manufacturing an ultra-thin glass substrate of the present disclosure.

As shown in FIG. 31, firstly a glass base material 1 is provided, n substrate areas 11 and a skeleton area 12 surrounding the substrate areas 11 are preset on the glass base material 1, wherein n is greater than or equal to 1. The width of the glass base material 1 ranges from 10 μm to 150 μm. The substrate areas 11 are arranged in a rectangle shape on the glass base material 1, adjacent substrate areas 11 are separated from each other by the skeleton area 12. At least an etching protection layer is formed on the upper surface and the lower surface of the substrate area 11 of the glass base material 1, respectively. The glass base material 1 is immersed in a reaction chamber.

Figure 32:
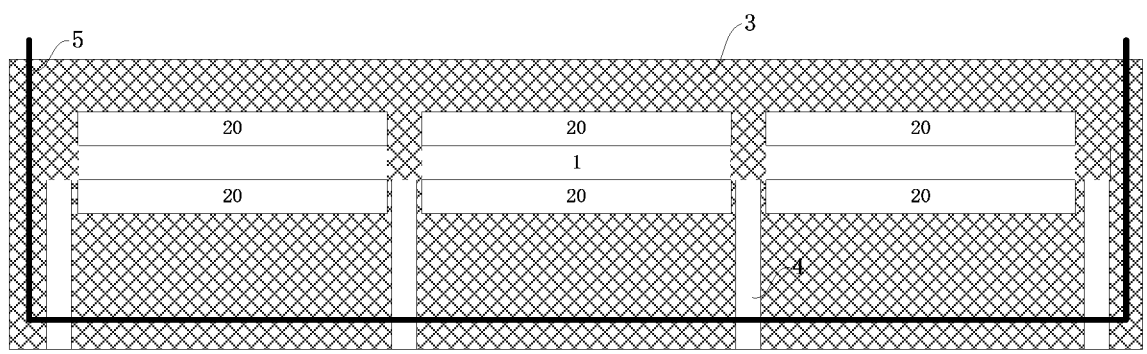

As shown in FIG. 32, the glass base material 1 is immersed into a reaction chamber having etching medium 3. The reaction chamber further includes a plurality of support members 4 to support the glass base material 1 and a basket 5 under the support members 4 along the gravity direction, the support members 4 support the skeleton area 12 of the glass base material 1, the etching medium at least etches the skeleton area 12 of the glass base material 1. The support members 4 only support the skeleton area 12 of the glass base material 1, the basket 5 has through holes used for the support members 4 going through, a first projection of each gap between the support members 4 on the basket 5 is larger than or equal to a second projection of each substrate area 11 on the basket 5. The etching protection layer only covers the upper surface and the lower surface of each substrate area 11, an upper surface and a lower surface of the skeleton area 12 are both not covered by the etching protection layer.

Figure 33:
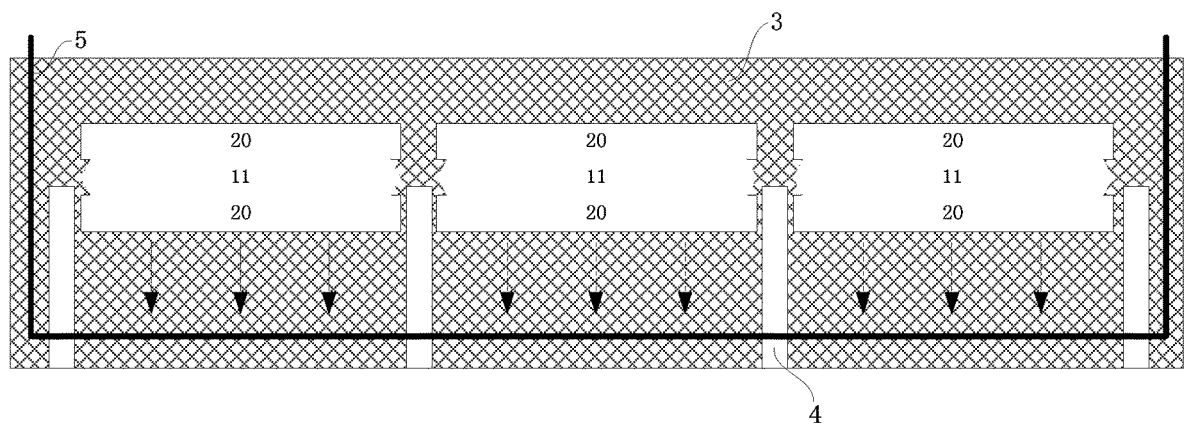
Figure 34:
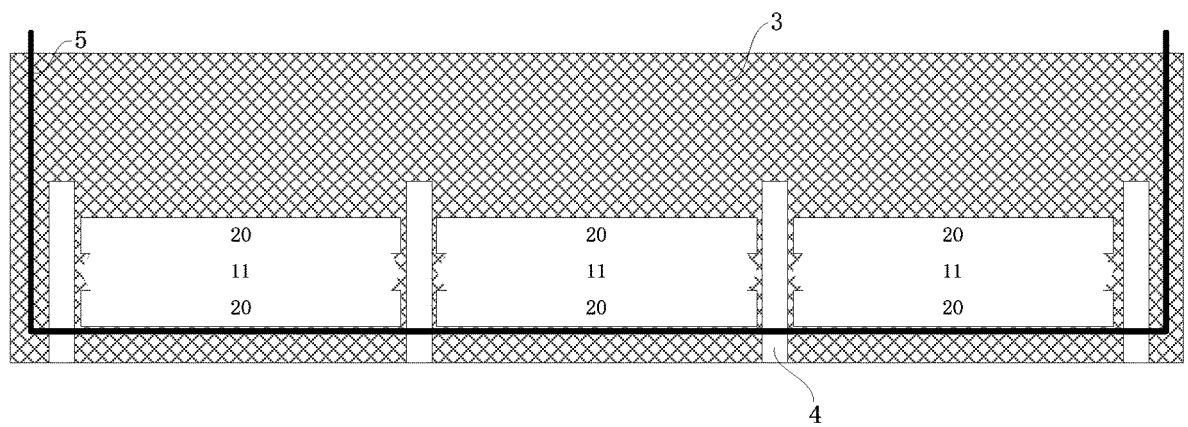

As shown in FIGS. 33 and 34, when the edge of the substrate area 11 is etched to form the stress dissipation edge 13 and separated from the glass base material 1, the substrate areas 11 fall down by gravity, and pass through the passages between the support members 4. Then whether the substrate areas 11 are separated from the glass base material 1 and fall into the basket 5 are detected, if yes, then perform the following step of pulling out the basket 5.

Figure 35:
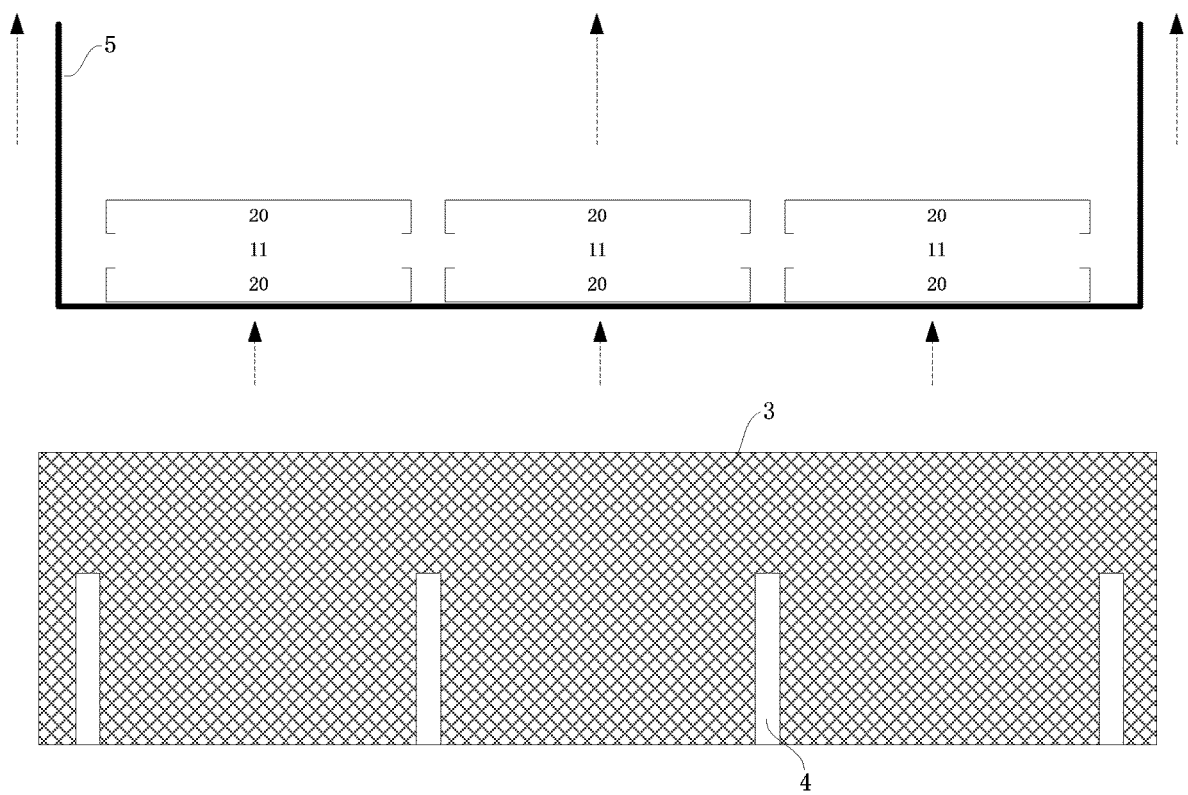

As shown in FIG. 35, the basket 5 is pulled out of the reaction chamber, and the substrate areas 11 separated from the glass base material 1 are pulled out together with the basket 5, then the etching protection layer is removed to get independent glass substrates 14.

Above all, the present disclosure per an embodiment is aimed to provide a method for manufacturing an ultra-thin glass substrate, to prevent quality of the ultra-thin glass substrate from damage caused by scribing wheel cutting or laser cutting, steps of manufacturing the glass substrate are simplified, processing speed of the glass substrate is accelerated, stress dissipation effect of the edges of the substrate areas is enhanced, and the quality of the ultra-thin glass substrate is improved.

The above is a detailed description of the present disclosure in connection with the specific preferred embodiments, and the specific embodiments of the present disclosure are not limited to the description. Modifications and substitutions can be made without departing from the spirit and scope of the present disclosure.

What is claimed is:

1. A method for manufacturing an ultra-thin glass substrate, the method comprising:
   providing a glass base material preset with n substrate areas and a skeleton area surrounding the substrate areas, wherein n is greater than or equal to 1;
   at least forming an etching protection layer on an upper surface and a lower surface of each substrate area of the glass base material, respectively;
   at least etching the skeleton area of the glass base material to separate the substrate areas from the glass base material, and form a stress dissipation edge along an edge of each substrate area; and
   removing the etching protection layer to get independent glass substrates;
   wherein the at least forming comprises:
   forming a polymeric reinforcing layer on at least one side of the upper surface and the lower surface of each substrate area of the glass base material, wherein components of the polymeric reinforcing layer comprise acrylic, organic polymer material containing silicon, epoxy resin, fluororesin, polyamide, polyimide, polycarbonate, polyethylene terephthalate and poly-1,4-cyclohexanedimethyl terephthalate; and
   forming the etching protection layer on one side of the polymeric reinforcing layer departing from the substrate areas.

2. The method of claim 1, wherein, by using a first etching process, the whole skeleton area of the glass base material is removed, and the substrate areas protected by the etching protection layer are reserved; and
   by using a second etching process, the stress dissipation edge is formed along the edge of each substrate area.

3. The method of claim 1, wherein, by using one etching process, the whole skeleton area of the glass base material is removed, and the stress dissipation edge is formed along the edge of each substrate area.

4. The method of claim 1, wherein, the etching protection layer only covers the upper surface and the lower surface of each substrate area, an upper surface and a lower surface of the skeleton area both lack coverage by the etching protection layer.

5. The method of claim 1, wherein, one side of the glass base material is fully covered by the etching protection layer, on the other side of the glass base material, only the substrate areas are covered by the etching protection layer, and the skeleton area lacks coverage by the etching protection layer.

6. The method of claim 1, wherein, the substrate areas are arranged in a rectangle shape on the glass base material, adjacent substrate areas are separated from each other by the skeleton area.

7. The method of claim 1, wherein, the stress dissipation edge is a circular-arc edge, a blade edge, or a polygonal edge, the blade edge or the polygonal edge comprises at least one straight hypotenuse or arcuate hypotenuse, an angle between the hypotenuse and the glass base material ranges from 15° to 90°, a thickness of the glass base material ranges from 10 μm to 150 μm; and
   the stress dissipation edge surrounds the edge of each substrate area, and a width of the stress dissipation edge ranges from 5 μm to 300 μm.

8. The method of claim 1, wherein, by using one etching process, the whole skeleton area of the glass base material is removed, at least one through hole and/or thinner area is formed on each substrate area, and the stress dissipation edge is formed along the edge of each substrate area.

9. The method of claim 1, wherein,
the etching protection layer comprises at least one opening area exposing a part of the substrate area.

10. The method of claim 1, wherein, the etching protection layer comprises at least one opening area exposing a part of the substrate area;
the at least etching comprises: at least etching the skeleton area of the glass base material to separate the substrate area from the glass base material, form at least one through hole and/or thinner area on the substrate area through the opening area, and form the stress dissipation edge along the edge of each substrate area; and
the removing the etching protection layer comprises: removing the etching protection layer to get independent glass substrates having the through hole and/or the thinner area.

11. The method of claim 10, wherein, by using a first etching process, the whole skeleton area of the glass base material is removed, and the substrate areas protected by the etching protection layer are reserved; and
by using a second etching process, at least one through hole and/or thinner area is formed on each substrate area, and the stress dissipation edge is formed along the edge of each substrate area.

12. The method of claim 10, wherein, the at least forming comprises:
forming a panel function layer on at least one side of the upper surface and the lower surface of each substrate area of the glass base material, wherein the panel function layer comprises one of a TFT rear panel, an organic light emitting layer, a touch detection layer, a fingerprint identification layer, and a cover plate or a combination thereof; and
forming an etching protection layer on one side of the panel function layer departing from the substrate area, wherein the etching protection layer comprises at least one opening area exposing a part of the substrate area.

13. The method of claim 10, wherein, an opening area is any one of a circular hole, an oval hole, and a water drop-shaped hole.

14. A method for manufacturing a display panel, comprising the method for manufacturing an ultra-thin glass substrate of claim 1.

15. The method for manufacturing a display panel of claim 14, wherein, the etching protection layer comprises at least one opening area exposing a part of the substrate area;
the at least etching comprises: at least etching the skeleton area of the glass base material to separate the substrate area from the glass base material, form at least one through hole and/or thinner area on the substrate area through the opening area, and form the stress dissipation edge along the edge of each substrate area; and
the removing the etching protection layer comprises: removing the etching protection layer to get independent glass substrates having the through hole and/or the thinner area; and
the through hole is used to install an acoustical sensor or an optical sensor, and a lower surface of the thinner area is provided with a fingerprint sensor.

16. A method for manufacturing an ultra-thin glass substrate, the method comprising:
providing a glass base material preset with n substrate areas and a skeleton area surrounding the substrate areas, wherein n is greater than or equal to 1;
at least forming an etching protection layer on an upper surface and a lower surface of each substrate area of the glass base material, respectively;
at least etching the skeleton area of the glass base material to separate the substrate areas from the glass base material, and form a stress dissipation edge along an edge of each substrate area; and
removing the etching protection layer to get independent glass substrates;
wherein after the removing the etching protection layer, the method further comprises:
forming a polymeric reinforcing layer on at least one side of an upper surface and a lower surface of the glass substrate, wherein components of the polymeric reinforcing layer comprise acrylic, organic polymer material containing silicon, epoxy resin, fluororesin, polyamide, polyimide, polycarbonate, polyethylene terephthalate and poly-1,4-cyclohexanedimethyl terephthalate.

17. A method for manufacturing an ultra-thin glass substrate, the method comprising:
providing a glass base material preset with n substrate areas and a skeleton area surrounding the substrate areas, wherein n is greater than or equal to 1;
at least forming an etching protection layer on an upper surface and a lower surface of each substrate area of the glass base material, respectively;
at least etching the skeleton area of the glass base material to separate the substrate areas from the glass base material, and form a stress dissipation edge along an edge of each substrate area; and
removing the etching protection layer to get independent glass substrates;
wherein the at least forming comprises:
forming a polymeric reinforcing layer on at least one side of the upper surface and the lower surface of each substrate area of the glass base material, wherein components of the polymeric reinforcing layer comprise acrylic, organic polymer material containing silicon, epoxy resin, fluororesin, polyamide, polyimide, polycarbonate, polyethylene terephthalate and poly-1,4-cyclohexanedimethyl terephthalate; and
forming a panel function layer on one side of the polymeric reinforcing layer departing from the substrate area, wherein the panel function layer at least comprises a TFT rear panel, an organic light emitting layer and a touch detection layer stacked in sequence on the substrate areas, and forming an etching protection layer on one side of the panel function layer departing from the substrate area.

18. The method according to claim 17, wherein, the etching protection layer covers a surface of a panel function layer departing from the substrate area and four side surfaces of the panel function layer.

* * * * *